June 19, 1928.  1,673,866
T. H. DALY
TRACTOR SCOOP
Filed March 14, 1927
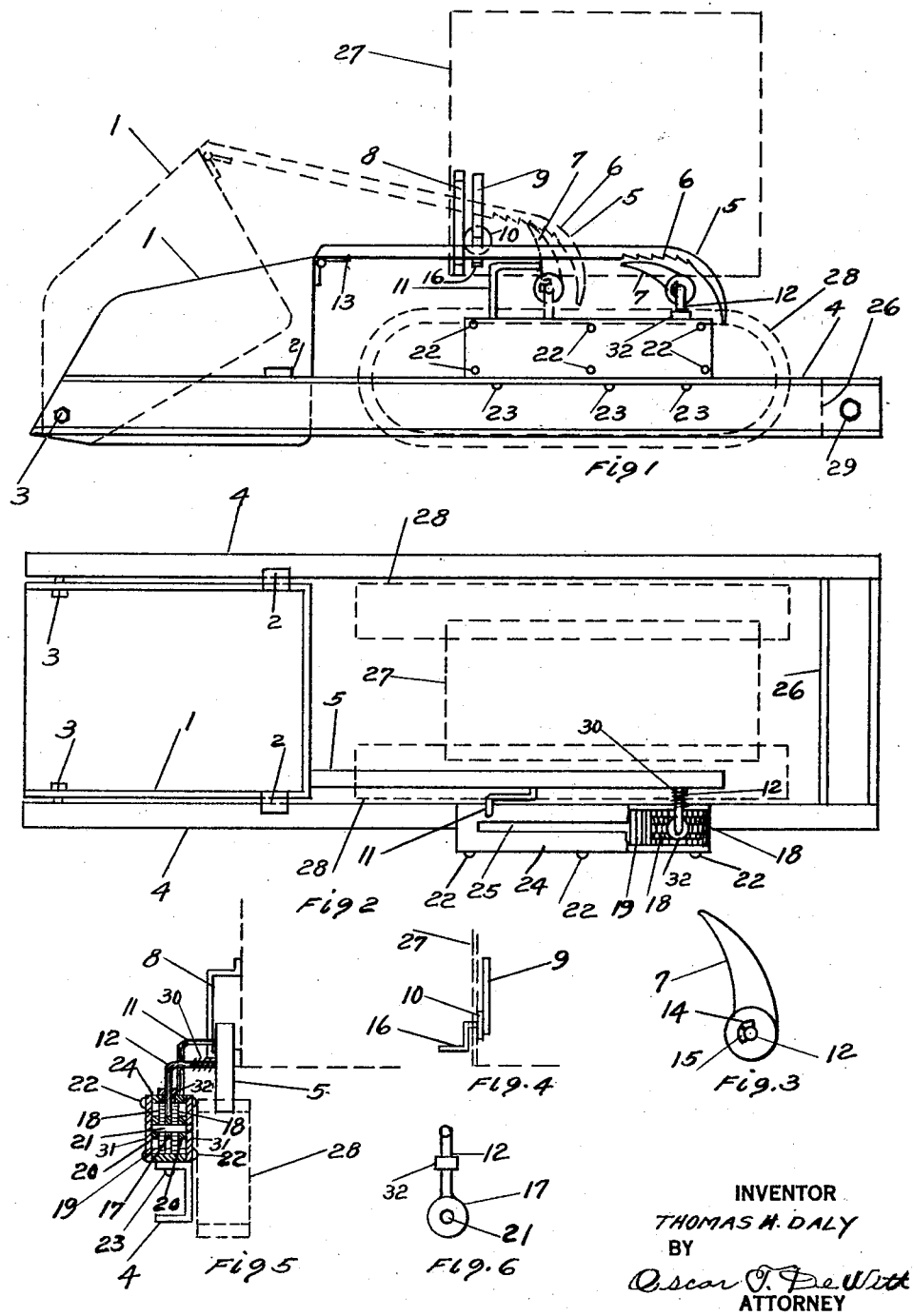
INVENTOR
THOMAS H. DALY
BY
Oscar J. DeWitt
ATTORNEY Patented June 19, 1928.

UNITED STATES PATENT OFFICE.

THOMAS H. DALY, OF DALTON, MASSACHUSETTS.

TRACTOR SCOOP.

Application filed March 14, 1927. Serial No. 175,325.

The primary object of my invention is to provide a tractor scoop that can be attached to an ordinary "caterpillar" tractor and to work automatically with the forward traction of the "caterpillar" tractor.

Another object of my invention is to provide a tractor scoop so designed and constructed that the tractor scoop may automatically be tilted when the "caterpillar" tractor is running in a forward direction.

Another object of my invention is to provide a tractor scoop that can be used to remove snow or earth and carry away the same in the scoop.

While I have shown and described with particularity only one preferred form of my invention, I do not desire to be limited to the exact structural details thereof since variations in the arrangement and construction of the parts may be made without departing from the spirit of my invention as defined in the appended claims.

Referring to the drawings, in which like numerals refer to like parts,

Figure 1 is an elevation view of the tractor scoop attached to a "caterpillar" tractor.

Figure 2 is a plan view in part sections to show the carrier means.

Figure 3 is an enlarged view of the carrier pawl.

Figure 4 is a view of the means to raise and lower the scoop arm.

Figure 5 is a sectional view of the carrier means.

Figure 6 is an enlarged view of the pawl shaft.

The scoop 1 is provided with projecting lugs 2 which rest on the side arms 4 and are for the purpose of keeping the scoop in a horizontal position, and the said side arms 4 are pivotally connected to the scoop 1 by means of the bolts 3. The rear end of the side arms 4 are also pivotally connected to the cross arm 26 by means of the bolts 29. The cross arm 26 is a part of the tractor and connected thereto, which connection to the tractor is not shown on the drawings.

A scoop arm 5 is pivotally attached at the rear end of the scoop at the top by means of the hinge 13, and the scoop arm extends to the rear end of the tractor cab 27 and the said arm is provided with a depending curve at the rear end. The scoop arm 5 is also provided with a plurality of notches 6 so that it may engage with the carrier pawl 7. The scoop arm 5 works up and down in an angular position in the guide 8, and the said guide is for the purpose of holding the scoop arm 5 in position.

The tractor cab 27 has extending thru the side at the forward end a scoop arm lifter 16 which is operated by means of a handle 9, and the scoop arm lifter is held in position against the side of the tractor cab by means of the plate 10.

The scoop arm 5 is operated by a carrier pawl 7 connected to a pawl shaft 12, and the said pawl and shaft cooperate with a plurality of gears 18, which gears are in mesh with and travel in a longitudinal direction on a gear rack 19. The gears are rotatably mounted on a gear shaft 21 and are free to rotate therearound. The gears are prevented from coming in contact with each other or with the side plates 31, by means of the collars 20 and the pawl shaft 12. The pawl shaft 12 extends from the pawl 7, and the said pawl shaft is provided with a shoulder 17, and the pawl shaft is connected to the gear shaft 21 and the said gear shaft is free to rotate therein. A top plate 24 is provided with a slot 25 for the free longitudinal travel of the pawl shaft 12. The gear rack 19 and the top plate 24 are connected to the side plates 31 by means of the bolts 22, and the entire combination is secured to the side arm 4 by means of the bolts 23. A collar 32 is connected to the pawl shaft 12 and is for the purpose of maintaining the pawl shaft in an upright position, and the said collar rests on the top plate 24 and slides back and forth with the action of the pawl shaft.

The carrier pawl 7 is provided with a spring 30, of coil design, and one end of the spring is attached to the carrier pawl 7 and the other end to the pawl shaft 12. The purpose of the spring is to carry the pawl forward when it is released from the notches 6 in the scoop arm 5, thereby allowing the depending end of the scoop arm 5 to engage in the thread of the "caterpillar" tread 28. The pawl is provided with a segmental recess 14, and an external projection 15 extends from the shaft 12 and operates with the said pawl to prevent it from dropping down into a depending vertical position. The circular recess 14 on the pawl is so designed that the projection 15 on the shaft 12 will hold the carrier pawl in position so that it will engage with the trip pin 11 to trip the carrier pawl.

The operation of the device is as follows:

When it is desired to operate the scoop 1 the handle 9 of the scoop arm lifter 16 is manually operated and the scoop arm 5 is raised which operates the pawl 7, and by means of the spring 30 the pawl 7 is carried forward and caused to disengage with the notches 6 on the scoop arm 5, thereby allowing the scoop arm 5 to drop and cause the depending curved end of the scoop arm to engage with the tread on the "caterpillar" tread 28.

The tractor is then started forward and the scoop arm 5 is carried forward by the "caterpillar" tread, the depending curved end of the scoop arm engaging in the "caterpillar" tread, which action causes the rear end of the scoop 1, by means of the pivot connection 13, to be tilted upward and the forward end of the scoop to work on the pivot 3. The scoop arm 5, with the forward motion, comes in contact with the carrier pawl 7, and the pressure exerted by the scoop arm on the carrier pawl will cause the said pawl to move forward and carry along with it the gears 18 which run in mesh on the gear rack 19. When the forward end of the carrier pawl 7, which is held in practically a horizontal position by means of the spring 30 and the projection 15 on the shaft 12 working within the circular recess 14, engages with the trip pin 11, the pawl will be brought to a vertical position by means of the trip pin 11, thereby causing the carrier pawl to engage with the notches 6 on the scoop arm 5 and raise the said scoop arm and disengage it from the tractor tread. It will be seen that the scoop arm 5 will remain in a fixed position against the "caterpillar" tread 28 until the carrier pawl 7 is brought in contact with the trip pin 11 and the said carrier pawl raised to a vertical position thereby disengaging the scoop arm from the "caterpillar" tread.

When the scoop arm 5 engages with the carrier pawl 7 at the forward end of the tractor cab 27, thereby disengaging the scoop arm from the "caterpillar" tread, the weight of the scoop will automatically cause the scoop arm to return to a normal position. This return motion is regulated by means of the gears 18 running on the gear rack 19 and being carried along by the force exerted on the pawl, shaft 12, and will cause the scoop arm to return to a normal position at a rate of speed regulated by the size of the gears 18 and the gear rack 19.

The primary object of the device is to remove snow and earth, and the result is accomplished by driving the tractor in a forward direction, and is preferably to be used in removing loose material. The cutting edge of the scoop 1 is slightly above the surface of the ground and tapered so that the scoop may ride easily over any rough surface, and the side arms 4 being pivotally connected to the cross arm 26 allow for any variation in the ground surface.

The scoop 1 is retained in a normal position, as shown by the full lines, when the scoop arm 5 is disengaged in the "caterpillar" tread 28. The tractor when driven in a forward direction permits the scoop 1 to be filled and the contents carried to any desired place by the tractor. When it is desired to empty the scoop 1, the scoop arm is caused to engage in the "caterpillar" tread 28, and the forward motion of the tractor will cause the scoop to be tilted and the contents emptied.

Having thus described my invention, what I claim as new and desire to secure by Letters Patent is:—

1. In a device of the class described, the combination of a scoop, a scoop arm provided with a depending curve at the rear end, said scoop arm provided with a plurality of notches, a scoop arm lifter, said scoop arm lifter to provide the means to engage and disengage the scoop arm with a tractor tread, side arms pivotally attached to the scoop and to a tractor, means to tilt the scoop, a gear rack, a plurality of gears in mesh with said gear rack, said gear and gear rack to provide the carrier means for the scoop arm, a pawl shaft provided with a collar, a gear shaft extending thru the said gears and pawl shaft and free to rotate therein, side plates, a top plate provided with a longitudinal slot, a carrier pawl provided with a circular recess, and rotatably mounted on the pawl shaft, means to retain the carrier pawl in a horizontal position, a spring attached to the carrier pawl and the pawl shaft, and means to trip the said carrier pawl to cause it to engage with the notches on the scoop arm and to disengage the scoop arm from the tractor tread.

2. In a device of the class described, the combination of a scoop, a scoop arm pivotally attached to said scoop, the rear end of the scoop arm provided with a depending curve, a scoop arm lifter, said scoop arm lifter to provide the means to engage and disengage the scoop arm with a tractor tread, side arms pivotally attached to the scoop and to a tractor, means to tilt the scoop, a gear rack, a plurality of gears, said gears and gear rack to provide the carrier means for the scoop arm, a pawl shaft provided with a collar, a gear shaft extending thru the said gears and pawl shaft and free to rotate therein, side plates, a top plate, the top plate provided with a longitudinal slot for the travel of the pawl shaft, means to attach the side plates to the top plate and the gear rack, means to attach the gear rack to one of the side arms, a carrier pawl mounted on the pawl shaft, means to retain the carrier pawl in a horizontal position, a spring to operate said carrier pawl to release it from the scoop arm.

3. In a device of the class described, the combination of a scoop, a scoop arm pivotally attached to said scoop, the rear end of the scoop arm provided with a depending curve, manually actuated means to engage the scoop arm with a tractor tread, side arms pivotally attached to the scoop and to the tractor, means to tilt the scoop, a plurality of gears in mesh with a gear rack, a gear shaft extending thru the said gears, means to separate the said gears, side plates, a top plate, means to attach the side plates to the gear rack and the top plate, a pawl shaft extending from the gear shaft and mounted thereon, a carrier pawl rotatably mounted on said pawl shaft, a spring to operate said carrier pawl, said gears on gear rack to provide the means to regulate the speed of the carrier pawl, to return the scoop and scoop arm to a normal position.

4. In a device of the class described, the combination of a scoop, a scoop arm pivotally attached to said scoop, the rear end of said scoop arm provided with a depending curve, said scoop arm provided with a plurality of notches, on the under side at the rear end, means to engage and disengage the scoop arm with a tractor tread, side arms pivotally attached to the scoop and to the tractor, means to tilt the scoop when running in a forward direction, means to automatically return the scoop and scoop arm to a normal position.

5. In a device of the class described, the combination of a scoop, said scoop provided with lugs at the rear end, a scoop arm for said scoop provided with a depending curve at the rear end, means to engage and disengage the said scoop arm with a tractor tread, side arms pivotally attached to the scoop and to the tractor, means to tilt the scoop when running in a forward direction, means to automatically return the scoop and scoop arm to a normal position.

In testimony whereof I affix my signature.

THOMAS H. DALY.